(12) United States Patent
Zhang

(10) Patent No.: US 6,931,350 B2
(45) Date of Patent: Aug. 16, 2005

(54) REGRESSION-CLUSTERING FOR COMPLEX REAL-WORLD DATA

(75) Inventor: Bin Zhang, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 76 days.

(21) Appl. No.: 10/650,589

(22) Filed: Aug. 28, 2003

(65) Prior Publication Data

US 2005/0049826 A1 Mar. 3, 2005

(51) Int. Cl.⁷ .................... G06F 101/14; G06F 15/00
(52) U.S. Cl. ........................................................ 702/179
(58) Field of Search ................... 702/179, 127, 702/189, 181, 85, 108

(56) References Cited

U.S. PATENT DOCUMENTS

| | | | |
|---|---|---|---|
| 6,192,319 B1 * | 2/2001 | Simonson et al. | 702/81 |
| 6,507,616 B1 * | 1/2003 | Ryu | 375/240.13 |
| 6,720,895 B2 * | 4/2004 | Poulton et al. | 341/120 |
| 6,826,575 B1 * | 11/2004 | Waclawski | 707/102 |
| 2003/0132366 A1 * | 7/2003 | Gao et al. | 250/208.1 |
| 2003/0182082 A1 * | 9/2003 | Keller et al. | 702/179 |
| 2003/0220773 A1 * | 11/2003 | Haas et al. | 703/2 |
| 2004/0024773 A1 * | 2/2004 | Stoffel et al. | 707/102 |

* cited by examiner

*Primary Examiner*—Michael Nghiem
*Assistant Examiner*—Demetrius Pretlow

(57) ABSTRACT

A method and system for determining regression functions from a computer data input using K-Harmonic Means (KHM) regression clustering (RC) and comprising the steps of: (1) selecting K regression functions $f_1, \ldots, f_K$; (2) associating an i-th data point from the dataset with a k-th regression function using a soft membership function; (3) providing a weighting to each data point using a weighting function to determine the data point's participation in calculating a residue error; (4) calculating the residue error between the weighted i-th data point and its associated regression function; and, (5) iterating to minimize the total residue error. Such can be applied in data mining, economics prediction tools, marketing campaigns, device calibrations, visual image segmentation, and other complex distributions of real-world data.

19 Claims, 5 Drawing Sheets

REGRESSION-CLUSTERING FOR COMPLEX REAL-WORLD DATA

FIELD OF THE INVENTION

The present invention relates to Regression-Clustering (RC) for complex real-world data, and more specifically to a method and system providing an improved RC process based on K-Harmonic Means (KHM) clustering for determining regression functions with reduced residue error from a clustered dataset.

BACKGROUND OF THE INVENTION

Complex distributions of computer data inputs are often modeled using a mixture of simpler distributions. Clustering is one of the mathematical tools used to reveal the structure of this mixture. The same is true of data sets with chosen response variables on which a regression analysis can be run. Without separating clusters having very different response properties, the residue error of a regression function is large. Input variable selection could also be misguided to a higher complexity by the mixture.

In Regression-Clustering, K (>1) regression functions are simultaneously applied to a dataset to guide the clustering into K subsets. Each subset has a simpler distribution for matching to the subsets guiding function. Each function is regressed on its own subset of data thereby resulting in a much smaller residue error. Both the regressions and the clustering optimize a common objective function.

Two important data mining techniques include regression on data sets with chosen response variables, and clustering on data sets that do not have response information. An RC process is directed at handling the case in between, e.g., data sets that have response variables but do not contain enough information to guarantee high quality learning. The missing part of the response is essential. Missing information is generally caused by insufficiently controlled data collection, due to a lack of means, a lack of understanding or other reasons. For example, sales or marketing data collected on all customers may not have a label on a proper segmentation of the customers. Clustering processes partition a dataset into a finite number of subsets each containing similar data points. Dissimilarity labeled by the index of the partitions provides additional supervision of the K regressions, running in parallel, so that each regression works on a subset of similar data. The K regressions in turn provide the model of dissimilarity for clustering to partition the data. A "linkage" is a common objective function shared between the regressions and the clustering. Neither can be properly done alone without the other.

Regression-Clustering is not limited to linear regressions, and, when comparing RC between center-based clustering processes, KM (K-Means), KHM (K-Harmonic Means), and EM (Expectation Maximization), the centers are replaced by regression functions. RC refers to a regression-function-centered clustering process. "Clusterwise Linear Regression" uses linear regression and partitioning of the dataset in a process that locally minimizes the total mean square error over all K-regression. Also developed was an incremental version of the process to facilitate adding new observations into the dataset. The Spath process is based on a KM clustering process.

DeSarbo did research on "Clustered Linear Regression" using the same linear mixing of Gaussian density functions. The number of clusters in the work of Hennig is treated as unknown. Gaffney and Smyth's work is also based on an EM clustering process. Gaffney and Smyth showed applications of regression clustering on video stream data to reveal movements in image sequences.

Regression-Clustering finds real-world, practical or industrial application in many situations. In economics, demand curves help people to optimize pricing, see Varian, H. R. (1992), "Microeconomic Analysis," W. W. Norton & Company; 3rd edition. Better understanding of demand curves also helps companies to design multiple models of a product family to fully deploy the area under the demand curves in different segments of a market. Finding the best market segmentation has to be related to the objective that regression is trying to optimize. Regression-Clustering can accomplish both tasks in an integrated process.

The design of marketing campaigns and offering purchase incentives needs proper segmentation of customers. Without it, marketing campaigns and purchase incentives are blindly given to all potential customers as whole, which is wasteful and less effective. Regression analysis on past marketing campaign data seeks to provide a relationship between an effect and a campaign strategy, e.g., an increase of sales, profit, market share, etc., versus the amount, area or form of the investment, or other. But without proper customer segmentation, regression results are sub-optimal. Regression-Clustering is again a better mathematical tool because Regression-Clustering optimizes both regression and customer-segmentation with a common objective.

In measuring-device calibrations, regression is run on sampled data to calibrate the device's parameters. However, the accuracy of device may depend on many other factors, some of them may not be controllable or even well understood. The data collected using these devices has missing information, which can be handled by Regression-Clustering. These missing variables can be regarded as either missing input variables or missing response variables. Missing input variables may also be handled by Regression-Clustering in certain situations.

Many measuring devices work with single-use measuring agents. The manufacturing variations of the measuring agents from different batches are handled by a code, which selects the best set of parameters among multiple sets pre-calibrated and stored in the device. Such code design is based on many runs of regressions on different batches, a costly and time consuming process. Regression-Clustering can optimize both the regression and the clustering (code design) in one step without human intervention, which means significant savings in both time and labor.

Static or video images can include regions of continuous changes and boundaries of sudden changes in color. A static image can be treated as a mapping from a two-dimensional space to the three-dimensional RGB color-space image:$[a, b] \times [c,d] \rightarrow [0,255] \times [0,255] \times [0,255]$. Similarly, a video image can be treated as a mapping from three-dimensional space to another three-dimensional space, video:$[a,b] \times [c,d] \times T \rightarrow [0,255] \times [0,255] \times [0,255]$. Regression-Clustering is capable of automatically identifying the regions of continuous change and assigning a regression function, which interpolates that part of the image. Both image segmentation and interpolation can be done by Regression-Clustering.

Previous work on RC used K-Means (KM) and Expectation Maximization (EM) in RC processes, these RC processes have the same well-known problem of being sensitive to the initialization of the regression functions, and the K-Means and EM being sensitive to the initialization of the centers. Previously, a center-based clustering process using K-Harmonic Means has been developed Zhang, B., Hsu, M., Dayal, U. (2000), "K-Harmonic Means", Intl. Workshop on Temporal, Spatial and Spatio-Temporal Data Mining, Lyon, France Sept. 12; Zhang, B. (2001), "Generalized K-Harmonic Means—Dynamic Weighting of Data in Unsupervised Learning,", the First SIAM International Conference on Data Mining (SDM'2001), Chicago, USA, Apr. 5–7.

A KHM center-based clustering process, described in U.S. Pat. No. 6,584,433, issued to the present Assignee, is much less sensitive to initialization of centers than both K-Means and EM. U.S. Pat. No. 6,584,433 describes a harmonic average data clustering method and system. First, a plurality of data points for clustering is received. Next, a number K of clusters is also received. Then, K center points are initialized. For each center point, a new center position is then determined by using a K-Harmonic Means performance function.

It has been demonstrated through a number of experiments on randomly generated data sets that KHM converges to a better local optimum than K-Means and EM, as measured by a common objective function of K-Means Zhang, B. (2003), "Comparison of the Performance of Center-based Clustering Processes", the proceedings of PAKDD-03, Seoul, South Korea, April.

SUMMARY OF THE INVENTION

An object of the present invention is to provide an improved method and system for Regression-Clustering (RC) using a K-Harmonic Means (KHM) clustering process. The present invention also provides a new method and system for RC which uses an improved RC KHM process in addition to the possibility of using the existing family of RC processes.

Briefly, a computer embodiment of the present invention determines regression functions from a data input using K-Harmonic Means (KHM) regression clustering (RC). Processing such data includes (1) selecting K regression functions $f_1, \ldots, f_K$; (2) associating an i-th data point from the dataset with a k-th regression function using a soft membership function; (3) providing a weighting to each data point using a weighting function to determine the data point's participation in calculating a residue error; (4) calculating the residue error between the weighted i-th data point and its associated regression function; and, (5) iterating to minimize any total residue error. The determined regression functions can be applied in data mining, prediction, calibration, segmentation or response analysis.

An advantage of the present invention is a computer system is provided for RC process based on a K-Harmonic Means clustering process with other existing RC processes based on K-Means and EM.

Another advantage of the present invention is a computer system is provided for interpretations of the K-regression functions as a predictor and its combination with a K-way classifier.

These and other objects and advantages of the present invention will no doubt become obvious to those of ordinary skill in the art after having read the following detailed description of the preferred embodiment as illustrated in the drawing figures.

DETAILED DESCRIPTION OF THE EMBODIMENTS

Figure 1:
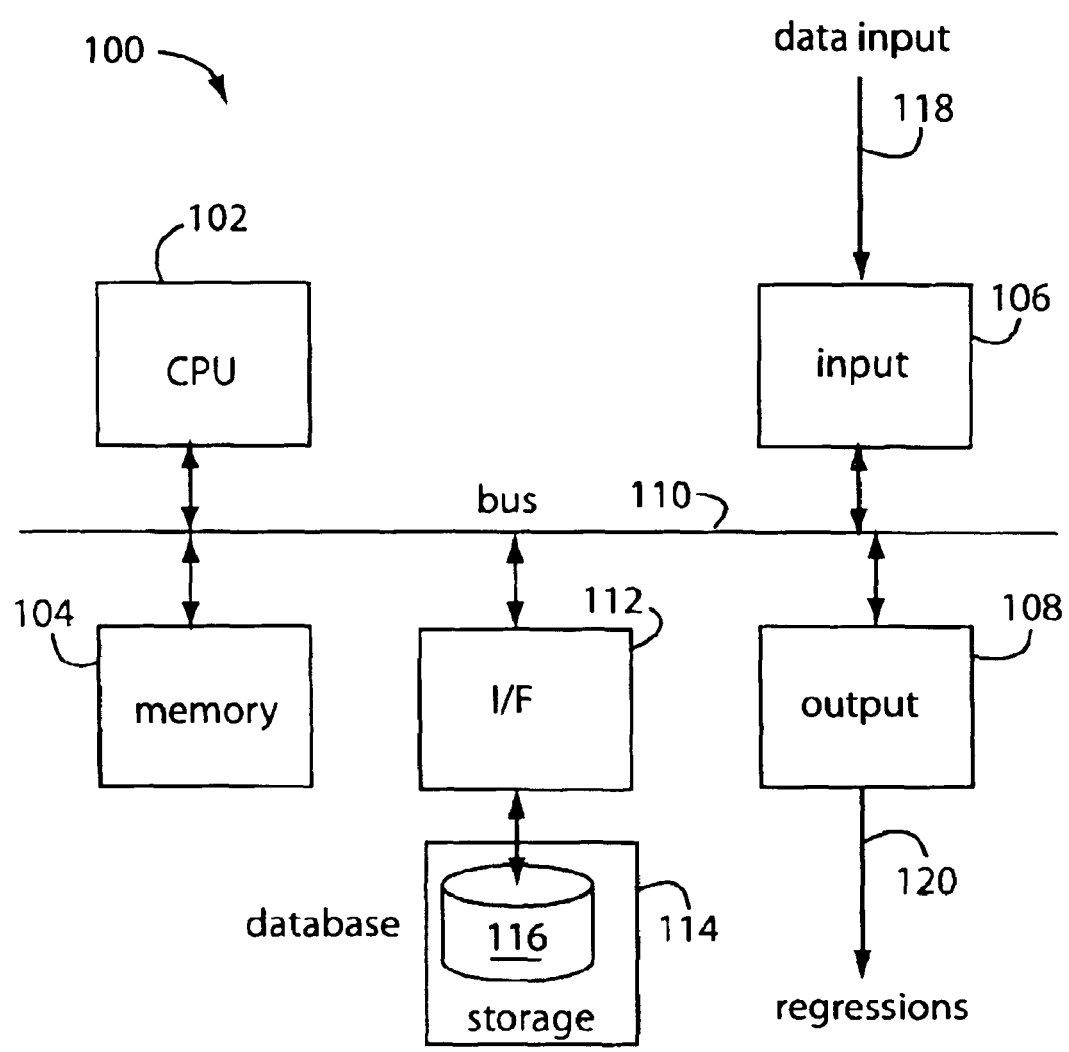
FIG. 1 is a functional block diagram of a processing system embodiment of the present invention.

A particular embodiment of the present invention can be realized using a processing system, an example of which is shown in FIG. 1. In particular, the processing system 100 generally includes at least a processor 102, a memory 104, an input device 106 and an output device 108, connected by a bus 110. An external interface 112 provides for coupling the processing system 100 to a storage device 114 which houses a database 116. The memory 104 can be any form of memory device, for example, volatile or non-volatile memory, solid state storage devices, magnetic devices, etc. The input device 106 can include, for example, a keyboard, pointer device, voice control device, data acquisition card, etc. The output device 108 can include, for example, a display device, monitor, printer, etc.

In operation, processing system 100 receives a data input 118, processes it, and outputs results in a regression output 120. Such data input is represented in FIGS. 3–12 by the dots in the scatter grams. The regression outputs are represented by one or more curve functions. These can be described by polynomials.

Such regression functions are computed from the data input using K-Harmonic Means (KHM) regression clustering (RC), as first described by the present inventor in earlier U.S. Patent Applications. Processing such data includes (1) selecting K regression functions $f_1, \ldots, f_K$; (2) associating an i-th data point from the dataset with a k-th regression function using a soft membership function; (3) providing a weighting to each data point using a weighting function to determine the data point's participation in calculating a residue error; (4) calculating the residue error between the weighted i-th data point and its associated regression function; and, (5) iterating to minimize any total residue error.

Figure 2:
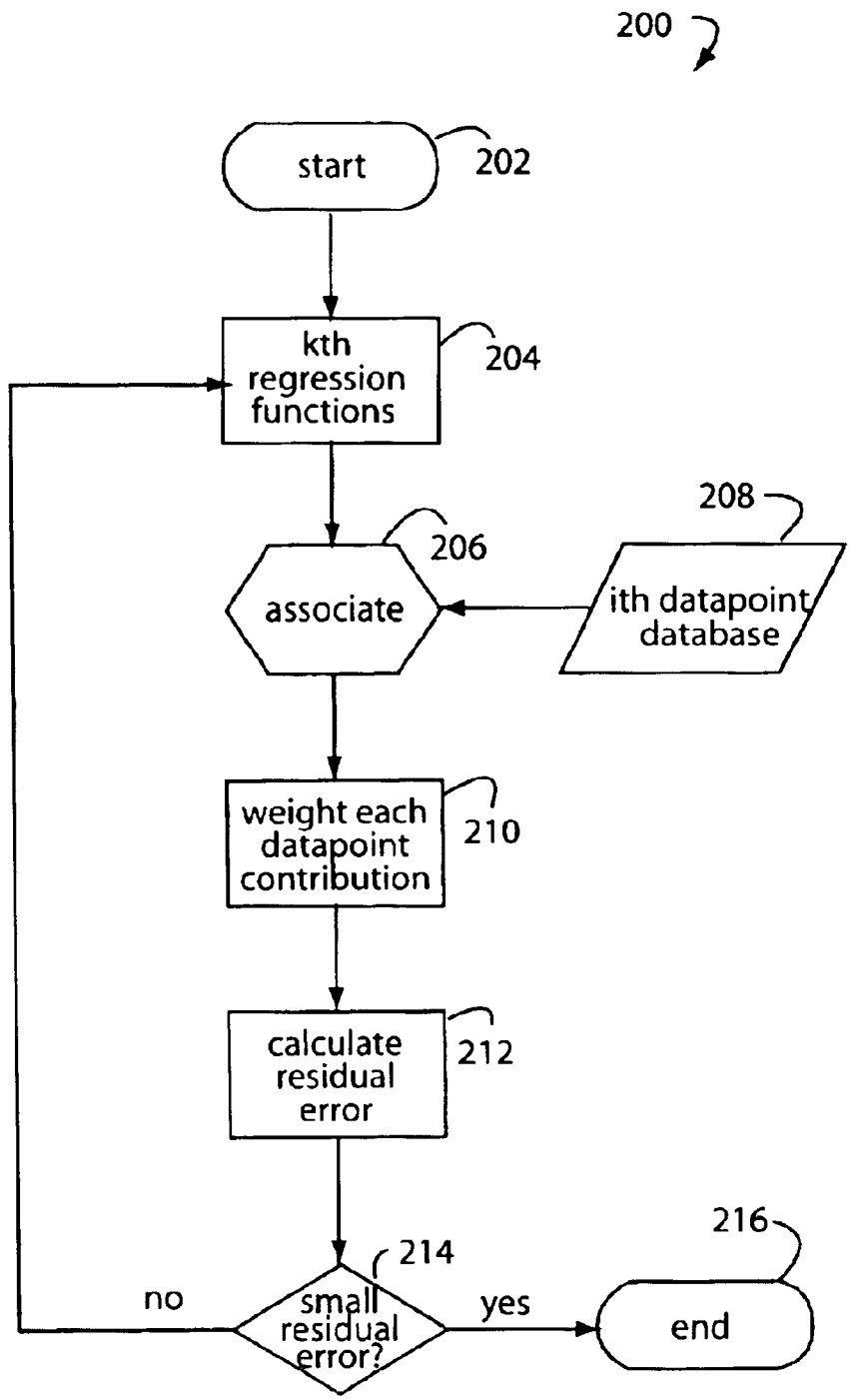
FIG. 2 is a flowchart diagram of a method embodiment of the present invention.

FIG. 2 diagrams a K-Harmonic Means regression clustering method embodiment of the present invention for determining regression functions from a computer data input, and is referred to herein by the general reference numeral 200. Such can be executed as software on system 100 (FIG. 1). The process 200 starts with a step 202. A step 204 selects K regression functions $f_1, \ldots, f_K$. At step 206 an i-th data point from the dataset 208 is associated with a k-th regression function obtained at selection step 206 using a soft membership function. At step 210 a weighting is provided to each data point using a weighting function to determine the data point's participation in calculating a residue error. At step 212 the residue error between the weighted i-th data point and its associated regression function is calculated. At step 214 a decision is made whether the total residue error is sufficiently small. If the total residue error is sufficiently small the method 200 can progress to end step 216. If the total residue error is not sufficiently small the steps 204 to 214 are iteratively done to reduce the total residue error until a satisfactory value is achieved.

Such method is typically embodied as computer software. RC can be built on top of existing regression program libraries and call an existing regression program as a subroutine. The present invention can be applied in complex distributions of real-world data, for example, as a data mining or prediction tool in economics, marketing campaigns, device calibrations, visual image segmentation, etc.

The processing system 100 can be used to implement an improved Regression-Clustering (RC) process based on a K-Harmonic Means (KHM) clustering process. Given a dataset with supervising responses, $Z=(X,Y)=\{(x_i,y_i)|i=1,\ldots,N\}$, a family of functions $\Phi=\{f\}$ and an loss function $e(\ ) \geq 0$, regression solves the following minimization problem, $$f^{opt} = \underset{f \in \Phi}{\mathrm{argmin}} \sum_{i=1}^{N} e(f(x_i), y_i) \qquad (1)$$

where, $\Phi$ is a function class with certain properties to make the optimization problem well defined, such as all polynomials below a certain degree. Usually, $$\Phi = \left\{ \sum_{l=1}^{m} \beta_l h(x, a_l) \;\middle|\; \beta_l \in R, a_l \in R^n \right\},$$

linear expansions of simple parametric functions, such as polynomials of degree up to m, Fourier series of bounded frequency, neural networks, RBF, etc. Also usually, $e(f(x), y)=\|f(x)-y\|^p$, with p=1,2 is most widely used Friedman, J., Hastie, T., and Tibshirani. R. (1998), Additive logistic regression: a statistical view of boosting. Technical report, Department of Statistics, Sequoia Hall, Stanford University, July.

Figure 3:
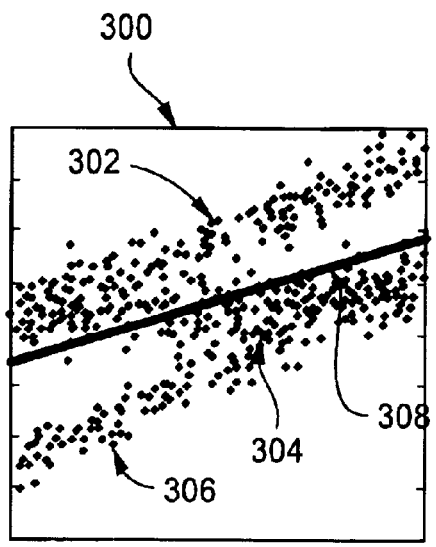
FIG. 3 is a diagram of a single function regressed on a dataset which actually is a mixture of three different distributions.
Figure 4:
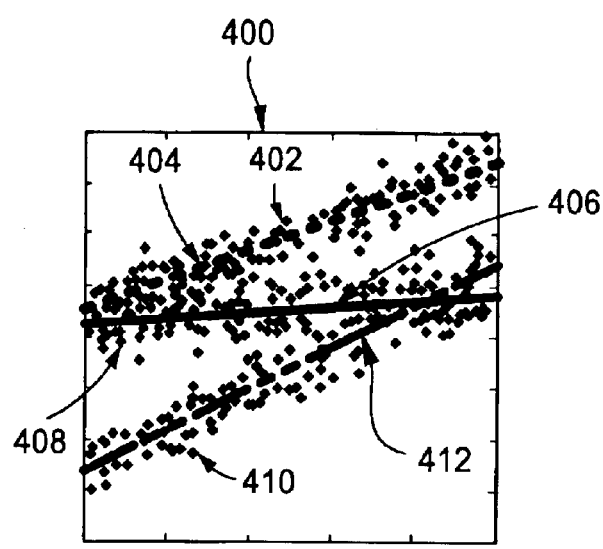
FIG. 4 is a diagram of three regression functions, each regressed on a subset of the dataset of FIG. 3.

Equation (1) is not effective when the dataset contains a mixture very different response characteristics as shown in FIG. 3, it is much better to find the partitions in the data and learn a separate function on each partition of the dataset as shown in FIG. 4.

FIG. 3 illustrates a data input 300 that has three likely subgroups 302, 304, and 306. These would ordinarily be lumped together and a single regression 308 would be output.

FIG. 4 illustrates a data input 400 that has a first subgroup 402 that can be regressed to a function 404, a second subgroup 406 that can be regressed to a function 408, and a third subgroup 410 that can be regressed to a function 412. Thus FIG. 4 shows the extraction of far more information from the data input.

It can be assumed that there are K partitions in the dataset. Determining the right K number is discussed in a clustering context by Tibshirani, R., Walther, G., and Hastie, T. (2000), "Estimating the Number of Clusters in a Dataset via the Gap Statistic", see http://www-stat.stanford.edu/~tibs/research.html; Hamerly and Elkan 2002, see http://www-cse.ucsd.edu/~ghamerly/academic/papers/icml03.pdf. K can also be determined (or bounded) by other aspects of the original problem.

In RC processes, K regression functions $M=\{f_1, \ldots, f_K\} \subset \Phi$ are applied to the dataset, each of which finds its own partition $Z_k$ and regresses on that partition $Z_k$. Both parts of the process—the K regressions and the partitioning of the dataset—optimize a common objective function. The partition of the dataset can be a "soft" partition given by K density functions defined on the dataset.

Clusterwise Linear Regression is a simple RC process. The K regressions do not have to be linear. RC-KM solves the following optimization problem, $$\underset{\{f_k\} \subset \Phi; \{Z_k\}}{\min} \mathrm{Perf}_{RC-KM} = \sum_{k=1}^{K} \sum_{(x_i,y_i) \in Z_k} e(f_k(x_i), y_i), \qquad (2)$$

or alternatively, $$\langle \{f_k^{opt}\}, \{Z_k\}\rangle = \underset{f \in \Phi, Z=\cup_{k=1}^{K} Z_k}{\mathrm{argmin}} \sum_{k=1}^{K} \sum_{(x_i,y_i) \in Z_k} e(f_k(x_i), y_i)$$

where $Z=\cup_{k=1}^{K} Z_k$ ($Z_k \cap Z_{k'} = \emptyset$, $k \neq k'$). The optimization is over both the K regression functions and the partition. The optimal partition will satisfy, $$Z_k = \{(x, y) \in Z \mid e(f_k^{opt}(x), y) \leq e(f_{k'}^{opt}(x), y) \forall k' \neq k\}, \qquad (3)$$

which allows one to replace the function in (2) by, $$\mathrm{Perf}_{RC-KM}(Z, \{f_k\}_{k=1}^{K}) = \sum_{i=1}^{N} \mathrm{MIN}\{e(f_k(x_i), y_i) \mid k = 1, \ldots, K\}. \qquad (4)$$

The RC-KM Process can be defined as a monotone-convergent process to find a local optimum of (2). Such includes:

Step 1: Pick K functions $f_1^{(0)}, \ldots, f_K^{(0)} \in \Phi$ randomly, or by any heuristics that are believed to give a good start.

Step 2: Clustering Phase: In the r-th iteration, $r=1, 2, \ldots$, repartition the dataset as $$Z_k^{(r)} = \{(x, y) \in Z \mid e(f_k^{(r-1)}(x), y) \leq e(f_{k'}^{(r-1)}(x), y) \forall k' \neq k\}. \qquad (5)$$

A tie can be resolved randomly among the winners. Intuitively, each data point is associated with the regression function that gives the smallest approximation error on it. Processically, for r>1, a data point in $Z_k^{(r-1)}$ is moved to $Z_{k'}^{(r)}$ if, a) $e(f_{k'}^{(r-1)}(x), y) < e(f_k^{(r-1)}(x), y)$ and b) $e(f_{k'}^{(r-1)}(x), y) \leq e(f_{k''}^{(r-1)}(x), y)$ for all $k'' \neq k, k'$.

$Z_k^{(r)}$ inherits all the data points in $Z_k^{(r-1)}$ that are not moved.

Step 3: Regression Phase: Run any regression optimization process that gives the following $$f_k^{(r)} = \underset{f \in \Phi}{\mathrm{argmin}} \sum_{(x_i,y_i) \in Z_k} e(f(x_i), y_i) \qquad (6)$$

for $k=1, \ldots, K$. The regression process is selected by the nature of the original problem or other criteria. RC adds no additional constraint on its selection.

Step 4: Stopping Rule: Run Step 2 and Step 3 repeatedly until there is no more data points changing membership of a subset.

Steps 2 and 3 do not increase the value of the objective function in equation (2). If any data changes membership in Step 2, the objective function is strictly decreased. Therefore, the process will stop in a finite number of iterations. For reference, see Regularization Girosi, F., Jones, M., and Poggio, T. (1995), "Regularization theory and neural network architectures," Neural Computation, Vol 7, 219–269; Eldeen, L. (1977), "Processes for the ill-conditioned least square problems,", BIT, 17, p134–145; and Vapnik, N. V. (1998), "Statistical Learning Theory," Wiley-Interscience, September to prevent over-fitting, and boosting techniques Schapire, R. E. (1999), "Theoretical views of boosting and applications." In *Tenth International Conference on Processic Learning Theory*; and Friedman, J., Hastie, T., and Tibshirani. R. (1998), Additive logistic regression: a statistical view of boosting. Technical report, Department of Statistics, Sequoia Hall, Stanford University, July to improve the quality of the converged results of the regression can also be used on each subset independently.

Variable selections Montgomery, D. C., Peck, E. A., Vining, G. G. (2001), "Introduction to Linear Regression Analysis, 3rd Edition", John Wiley & Sons; 3rd edition, April for the K regressions can also be done on each subset independently, with the understanding that an increase in the value of the objective function could result.

Mean Squared Error (MSE) linear regression with a KM process is one component of some embodiments of the present invention. Assuming $\overline{D}$ functions $h_1(x), \ldots, h_{\overline{D}}(x)$ are chosen as the basis, consider the function class $$\Phi = \left\{ \sum_{l=1}^{D} c_l h_l(x) \,\middle|\, c_l \in R \right\}.$$

To simplify the notations, let $$\bar{x} = (h_1(x), \ldots, h_{\overline{D}}(x)) \text{ and } \overline{X} = [\bar{x}_i]_{N \times \overline{D}}.$$

As an example, for the set of two-variable polynomials up to degree 2, the basis functions are $h_1(x)=1$, $h_2(x)=x_1$, $h_3(x)=x_2$, $h_4(x)=x_1^2$, $h_5(x)=x_1 x_2$, $h_6(x)=x_2^2$. This gives, $$X = \begin{bmatrix} x_{1,1} & x_{1,2} \\ \cdots & \cdots \\ x_{N,1} & x_{N,2} \end{bmatrix} \text{ and}$$

$$\overline{X} = \begin{bmatrix} 1 & x_{1,1} & x_{1,2} & x_{1,1}^2 & x_{1,1}x_{1,2} & x_{1,2}^2 \\ \cdots & \cdots & \cdots & \cdots & \cdots & \cdots \\ 1 & x_{N,1} & x_{N,2} & x_{N,1}^2 & x_{N,1}x_{N,2} & x_{N,2}^2 \end{bmatrix}.$$

With the MSE $e(f(x),y)=|f(x)-y|^2$, LinReg-KM minimizes the objective function $$Perf_{LinReg-KM}(Z, \{f_k\}_{k=1}^{K}) = \sum_{i=1}^{N} \text{MIN}\{\|\bar{x}_i * c_k - y_i\|^2 \mid k=1, \ldots, K\}.$$

From MSE regression theory, the coefficients of the optimal f is $c=(\overline{X}^{T*}\overline{X})^{-1}\overline{X}^{T*}y$ and $f(x)=\bar{x}*c$.

With row-partition of Z into K subsets $Z_1, \ldots, Z_K$, matrices $\overline{X}$ and Y are row-partitioned accordingly, $\overline{X} \rightarrow \overline{X}_1, \ldots, \overline{X}_K$ and $Y \rightarrow Y_1, \ldots, Y_K$, the coefficients of the optimal function on the k-th subset is (Step 3 of the RC-KM)

$$c_k = (\overline{X}_k^{T*}\overline{X}_k)^{-1} \overline{X}_k^{T*} Y_k. \tag{7}$$

The matrix of losses used for the comparisons in Step 2 of RC-KM is $$E=[e(f_k(x_i),y_i)]_{N \times K} = abs(\overline{X}*[c_1, \ldots, c_K] - [Y, \ldots, Y]). \tag{8}$$

There is no need to square the components because squaring is monotone.

The K-Means clustering process is known to be sensitive to the initialization of its centers. The same is true for RC-KM. Convergence to a poor local optimum has been observed frequently.

The K-Harmonic Means clustering process showed very strong insensitivity to initialization due to its dynamic weighting of the data points and its non-partitioning membership function Zhang, B. (2001), "Generalized K-Harmonic Means—Dynamic Weighting of Data in Unsupervised Learning,", the First SIAM International Conference on Data Mining (SDM'2001), Chicago, USA, Apr. 5–7; and Zhang, B. (2003), "Comparison of the Performance of Center-based Clustering Processes", the proceedings of PAKDD-03, Seoul, South Korea, April.

An improved method for RC based on a new regression clustering process, RC-KHM$_p$, can out-perform the RC-KM and RC-EM processes.

The objective function of RC-KHM$_p$ is defined by replacing the MIN( ) function in equation (4) by a harmonic average HA( ) function. The error function is $$e(f_k(x_i),y_i) = \|f_k(x_i) - y_i\|^p, \, p \geq 2,$$

$$Perf_{RC-KHM_p}(Z, M) = \sum_{i=1}^{N} HA_{1 \leq k \leq K}\{\|f_k(x_i) - y_i\|^p\} \tag{9}$$

$$= \sum_{i=1}^{N} \frac{K}{\sum_{k=1}^{N} \frac{1}{\|f_k(x_i) - y_i\|^p}}$$

The method using the new RC-KHM process includes the steps of:

Step 1: Pick K functions $f_1^{(0)}, \ldots, f_K^{(0)} \in \Phi$ randomly or using any heuristic technique believed to offer an improved starting point.

Step 2: Clustering Phase: In the r-th iteration, let $$d_{i,k} = \|f_k^{(r-1)}(x_i) - y_i\|. \tag{10}$$

The hard partition $Z = U_{k=1}^{K} Z_k$, in RC-KM, is replaced by a "soft" membership function: the i-th data point is associated with the k-th regression function with probability $$p(Z_k \mid z_i) = \frac{d_{i,k}^{p+q}}{\sum_{l=1}^{K} d_{i,l}^{p+q}}. \tag{11}$$

the choice of q will put the regression's error function in $L^q$-space. See equation (13).

This is more general than the previous K-Harmonic Means clustering process of the earlier work of the inventor, cited herein, which was limited by only being able to address the situation when q=2.

For simpler notation, $p(Z_k|z_i)$ and $a_p(z_i)$ in equation (12) are not indexed by q.

Quantities $d_{i,k}, p(Z_k|z_i)$, and $a_p(z_i)$ should be indexed by the iteration r, which is also dropped.

In RC-KHM, not all data points fully participate in all iterations like in RC-KM. Each data point's participation is weighted by $$a_p(z_i) = \frac{\sum_{l=1}^{K} d_{i,l}^{p+q}}{\sum_{l=1}^{K} d_{i,l}^{p}}. \quad (12)$$

$a_p(z_i)$ is small if and only if $z_i$ is close to one of the functions. The weighting function $a_p(z_i)$ changes in each iteration as the regression functions are updated. If all functions drifted away from a point $z_i$ in the last iteration, $a_p(z_i)$ goes up.

Step 3: Regression Phase: Run any regression optimization process that gives the following $$f_k^{(r)} = \underset{f \in \Phi}{\operatorname{argmin}} \sum_{i=1}^{N} a_p(z_i) p(Z_k | z_i) \| f(x_i) - y_i \|^q \quad (13)$$

for k=1, ..., K.

Step 4: Since there is no discrete membership change in RC-KHM, the stopping rule is replaced by measuring the changes to its objective function (9), when the change is smaller than a threshold, the iteration is stopped.

In Linear Regression with K-Harmonic Means Clustering—LinReg-KHM, q=2 is chosen. Writing equation (13) in matrix form, $$c_k^{(r)} = \underset{c}{\operatorname{argmin}} (\overline{X} * c - Y)^T * \quad (14)$$

$$\underset{1 \le i \le N}{\operatorname{diag}}(a_p(z_i) p(Z_k | z_i)) * (\overline{X} * c - Y)$$

and its solution is $$c_k^{(r)} = \left( \overline{X}^T * \left[ \overline{x}_i \Big/ d_{i,k}^{p+2} \left( \sum_{l=1}^{K} \frac{1}{d_{i,l}^p} \right)^2 \right]_{N \times \overline{D}} \right)^{-1} * \quad (15)$$

-continued $$\overline{X}^T * \left[ y_i \Big/ d_{i,k}^{p+2} \left( \sum_{l=1}^{K} \frac{1}{d_{i,l}^p} \right)^2 \right]_{N \times \overline{D}}$$

where $d_{i,k} = \| \overline{x}_i * c_k^{(r-1)} - y_i \|$. ($[\alpha]_{N \times \overline{D}}$ is a matrix of size $N \times \overline{D}$ with entries $\alpha$ being one of three possibilities: row vectors, column vectors or scalars.) The inversion in equation (15) is on a $\overline{D} \times \overline{D}$ matrix.

The best of the linear mixing of Gaussian EM clustering process is the natural probability interpretation of its linear mixing (superposition). A brief presentation of RC-EM is included for comparing the performance of all three processes. The objective function for RC-EM is defined as $$\mathit{Perf}_{RC-EM}(Z, M) = -\log \left\{ \prod_{i=1}^{N} \sum_{k=1}^{K} \frac{p_k}{\sqrt{(2\pi)^d |\Sigma_k|}} \right. \quad (16)$$

$$\left. \mathrm{EXP}\left( -\frac{1}{2} (f_k(x_i) - y_i) \sum_{k}^{-1} (f_k(x_i) - y_i)^T \right) \right\}$$

where d=dim(Y). In case d=1, $(f_k(x_i) - y_i)$ is just a real number and $\Sigma_k^{-1} = 1/\sigma_k^2$.

The RC-EM recursion is given by

E-Step: (17)

$$p(Z_k^{(r)} | z_i) = \frac{\frac{p_k^{(r-1)}}{\sqrt{|\Sigma_k|}} \mathrm{EXP}\left( -\frac{1}{2} (f_k^{(r-1)}(x_i) - y_i) \sum_{r-1,k}^{-1} (f_k^{(r-1)}(x_i) - y_i)^T \right)}{\sum_{k=1}^{K} \frac{p_k^{(r-1)}}{\sqrt{|\Sigma_k|}} \mathrm{EXP}\left( -\frac{1}{2} (f_k^{(r-1)}(x_i) - y_i) \sum_{r-1,k}^{-1} (f_k^{(r-1)}(x_i) - y_i)^T \right)}$$

M-Step: (18)

$$p_k^{(r)} = \frac{1}{N} \sum_{i=1}^{N} p(Z_k^{(r)} | z_i)$$

$$f_k^{(r)} = \underset{f \in \Phi}{\operatorname{argmin}} \sum_{i=1}^{N} p(Z_k^{(r)}, z_i) \| f(x_i) - y_i \|^2 \quad (19)$$

$$\sum_{r,k} = \frac{\sum_{i=1}^{N} p(Z_k^{(r)} | z_i)(f_k^{(r)}(x_i) - y_i)^T (f_k^{(r)}(x_i) - y_i)}{N * p_k^{(r)}} \quad (20)$$

When MSE linear regression is used, equation (19) can be solved and takes the following special form, while all other equations (16)–(18) and (20) remain the same.

$$c_k^{(r)} = (\overline{X}^T * [p(Z_k^{(r)}, z_i) \overline{x}_i]_{N \times \overline{D}})^{-1} * \overline{X}^T * [p(Z_k^{(r)}, z_i) y_i]_{N \times 1} \quad (21)$$

Similarity between equation (21) and LinReg-KHM equation (15), or between equation (21) and LinReg-KM equation (7) is observed.

The computational cost of one iteration of RC has been compared with the cost of single linear regression on the whole dataset without clustering for all three examples LinReg-KM, LinReg-KHM and LinReg-EM presented herein. Such comparison shows the additional computational cost of switching from single function regression to RC. The comparison is only done for a basic version of regressions without input variable selection or boosting.

The cost of forming $\overline{X}$ is common to both RC and single linear regression.

In single linear regression, the cost of calculating $c=(\overline{X}^T*\overline{X})^{-1}\overline{X}^T*Y$ is the sum of, A) $\overline{D}^2*N$ units for forming $\overline{X}^T*\overline{X}$, B) $\overline{D}^2+\overline{D}*N$ units for forming $\overline{X}^T*Y$ C) $\beta\overline{D}^3$ for solving $(\overline{X}^T*\overline{X})*c=\overline{X}^T*Y$, $\beta$ is a small constant.

where $\overline{D}=m+1$ if $D=1$, or $$\overline{D} = \frac{D^{m+1}-1}{D-1}$$

for $D>1$. A "unit" of calculation here results from multiplying two numbers and adding the result to another number.

First $N \geq \overline{D}$, otherwise the regression has infinite solutions. It is assumed that $N>>\overline{D}$, otherwise the potential of over fitting (and over shoot) is high. In any case the dominate term is $O(\overline{D}^2*N)$.

Let $N_k$ be the size of the kth cluster, the total cost of K regressions is

A1)

$$\sum_{k=1}^{K} \overline{D}^2 * N_k = \overline{D}^2 * N$$

units for all $\overline{X}_k^T*\overline{X}_k$, k=1, ..., K

B1) $K\overline{D}^2+\overline{D}*N$ units for all $\overline{X}_k^T*Y_k$ and

C1) $K\beta\overline{D}^3$ for solving K linear equations, $(\overline{X}_k^T*\overline{X}_k)*c_k=\overline{X}_k^T*Y_k$ K is very small and it is not ever expected to be large (say >50).

The repartition cost for LinReg-KM is $O(\overline{D}*N*K)$ due to the number of error function evaluations and comparisons. Therefore, the cost of each iteration of LinReg-KM is of the same order of complexity as the simple single function regression.

The Applicant observed a quick convergence at the start in all experiments but some had a long tail.

The cost of calculating the repartition probabilities in LinReg-KHM and LinReg-EM are of the same order as the repartition cost in LinReg-KM.

With input variable selection, not all the variables selected for the single function regression need to appear in the selected variables for each subset. Therefore, the dimensionality of the regression problem on each subset may become lower.

Regression results are most often used for predictions, $y=f(x)$ is taken as a prediction of the response at a new $x \notin X$. With K regression functions returned by RC, K predictions $\{f_k(x)\}_{k=1}^{K}$ on the same input x are obtained, which is interpreted in this section.

Assuming that dataset X is Independently and Identically Distributed (IID) sampled from a hidden density distribution P( ). Kernel density estimation Silverman, B. W. (1998), "Density Estimation for Statistics and Data Analysis," Chapman & Hall/CRC on the K X-projections of $Z_k=\{p(Z_k|z)|z=(x,y)\in Z\}$ (for KHM and EM see equations (11) & (17), for KM they are the real subsets) gives $$\hat{P}(x|X_k) = \frac{\frac{1}{N}\sum_{i=1}^{N} p(Z_k|z_i)H\left(\frac{x_i-x}{h}\right)}{\hat{P}(X_k)} \quad (22)$$

with $$\hat{P}(X_k) = \frac{1}{N}\sum_{i=1}^{N} p(Z_k|z_i). \quad (23)$$

This is a more general subset concept than the classical. LinReg-KM produces real classical subsets, LinReg-KHM and LinReg-EM produce generalized subsets.

H( ) in equation (22) is a symmetric kernel and h the bandwidth. If the density estimation of each subset is added, the kernel density estimation on the whole dataset is obtained as, $$\hat{P}(x) = \sum_{k=1}^{K} \hat{P}(x|X_k)\hat{P}(X_k) = \frac{1}{N}\sum_{i=1}^{N} H\left(\frac{x_i-x}{h}\right). \quad (24)$$

Bayes' inversion gives the probability of x belonging to each subset, $$\hat{P}(X_k|x) = \frac{\hat{P}(x|X_k)\hat{P}(X_k)}{\hat{P}(x)} = \frac{\sum_{i=1}^{N} p(Z_k|z_i)H\left(\frac{x_i-x}{h}\right)}{\sum_{i=1}^{N} H\left(\frac{x_i-x}{h}\right)} \quad (25)$$

Let $f^\%(x)$ be the random variable prediction which equals $f_k(x)$ with probability $P(X_k|x)$, and the expected value of this prediction is estimated by $$E(f^\%(x)|(x) \approx \sum_{k=1}^{K} f_k(x)\hat{P}(X_k|x) = \frac{\sum_{i=1}^{N}\left[\sum_{k=1}^{K} f_k(x)p(Z_k|z_i)\right]H\left(\frac{x_i-x}{h}\right)}{\sum_{i=1}^{N} H\left(\frac{x_i-x}{h}\right)}. \quad (26)$$

A random variable contains more information than its expectation. Therefore, the RC prediction $f^\%(x)|x$, a random variable, gives more information than its expectation $E(f^\%(x)|x)$, which is expected to be close to, but usually not equal to, the single function regression on the whole dataset. Instead of giving a single valued prediction with a large uncertainty, $f^\%(x)|x$ gives K possible values each with a much smaller uncertainty. The significant part of the uncertainty is described by the probability distribution $\{P(X_k|x), k=1, \ldots, K\}$.

Using the concepts and the relationship that the total variance equals the within-cluster variance plus the between-cluster variance R. Duda & P. Hart, Pattern Classification, $2^{nd}$ Ed., Wiley-Interscience (2000), the single value prediction has the total variance. The K-value prediction $f^\%(x)|x$ breaks that total variance into the within-cluster variance and the between-cluster variance. The between cluster-variance can be reduced or eliminated if any knowledge outside the dataset helps to choose the k when a new input x is given.

A classifier, k=C(x), can be trained using the labels provided by the clustering phase of the RC process. In case the false classification rate of C is low, which is not true for all data sets, a prediction on x can be $f_{C(x)}(x)$.

The Applicant conducted sets of experiments: Set 1 for visualization of RC, and Set 2 for statistical comparisons of LinReg-KM, LinReg-KHM and LinReg-EM.

The dimensionality of X is 1, so that 2-dimensional visualization can be presented. Linear regression RC is already demonstrated in FIG. 4. Both quadratic and trigonometric regressions are done. Ploy-KHM, see Zhang, B., Hsu, M., Dayal, U. (2000), "K-Harmonic Means", Intl. Workshop on Temporal, Spatial and Spatio-Temporal Data Mining, Lyon, France Sept. 12, which performs better for one and two dimensional spaces, is used in this section.

Figure 5:
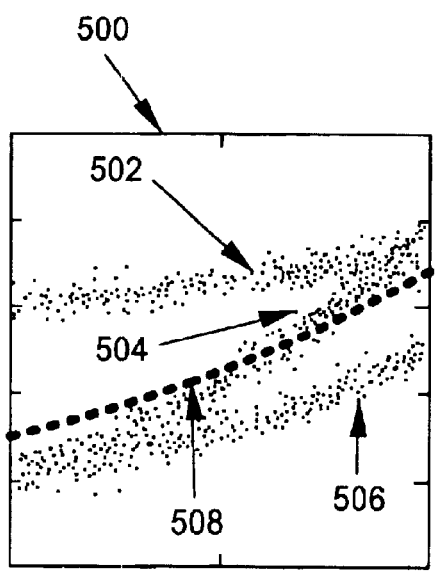
FIG. 5 is a diagram of a simple quadratic regression on a whole dataset.
Figure 6:
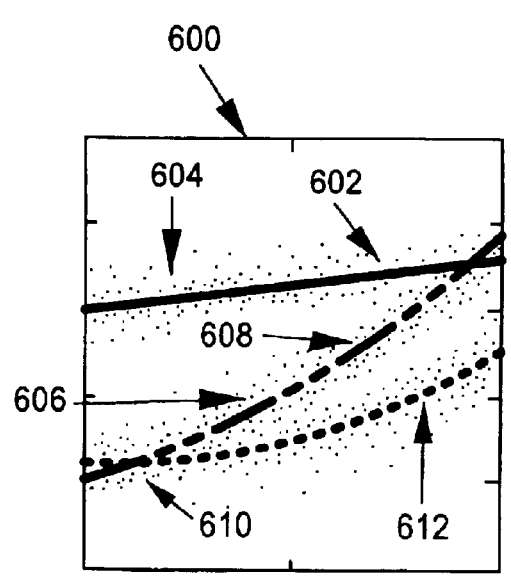
FIG. 6 is a diagram of regression KHM applied to the dataset in FIG. 5.

Referring to FIGS. 5 and 6, the parameters N=600, D=1, K=3 are used. FIG. 5 is the result of simple quadratic regression on a whole dataset comprised of subsets 502, 504, and 506. The single result is a function 508. FIG. 6 represents LinReg-KHM form of the present invention. A subset 602 regresses to a function 604, a subset 606 regresses to a function 608, and a subset 610 regresses to a function 612.

Figure 7:
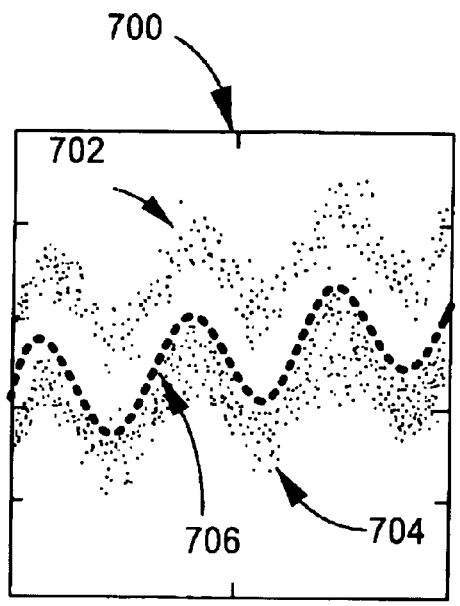
FIG. 7 is a diagram of a single regression applied to a whole dataset.
Figure 8:
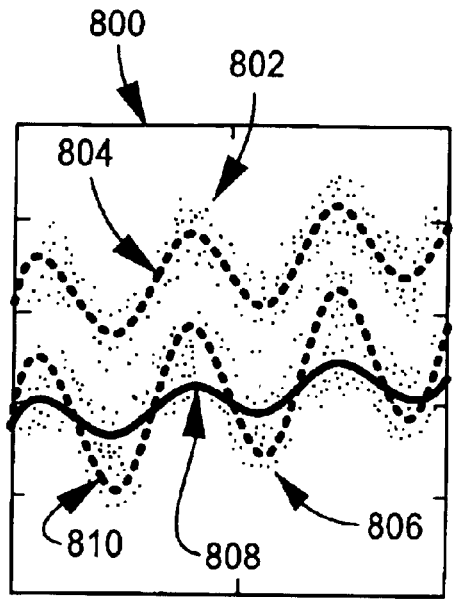
FIG. 8 is a diagram of three regression functions applied to the dataset of FIG. 7.

Referring to FIGS. 7 and 8, the parameters N=1200, D=1, K=3 are used. $\Phi=\{a_1\sin(6\pi x)+a_2 x+a_3 | a_i \in R\}$ and the dataset is a mixture of three subsets generated by three functions in $\Phi$ with added Gaussian noise. FIG. 7 shows one regression function applied to the whole dataset. FIG. 8 shows three regression functions being used. Each of the regression functions found a very good approximation of the original functions used to generate the dataset.

Figure 9:
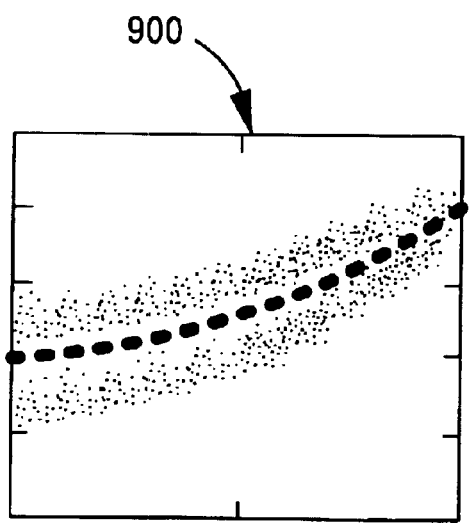
FIG. 9 is a diagram of a local optimum for a single regression on a dataset.
Figure 10:
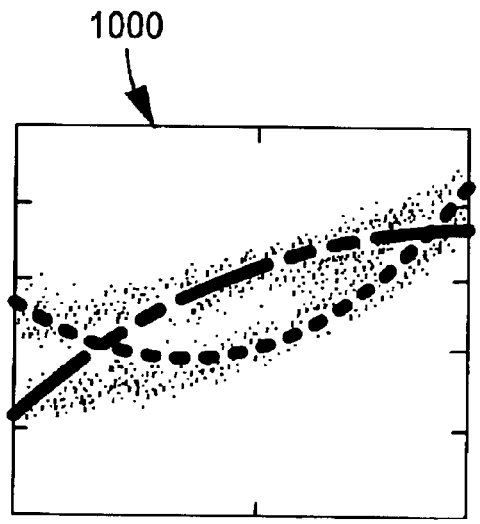
FIG. 10 is a diagram of a local optimum for dual regressions on the dataset of FIG. 9.

In FIG. 7, a local optimum is shown in FIG. 9 for a single regression function and in FIG. 10 for multiple regression functions. Such hints at how a processes can fail to reach a global optimum. Knowing this can be used to manually correct it, e.g., by providing a special initialization after recognizing a suspected result.

Figure 11:
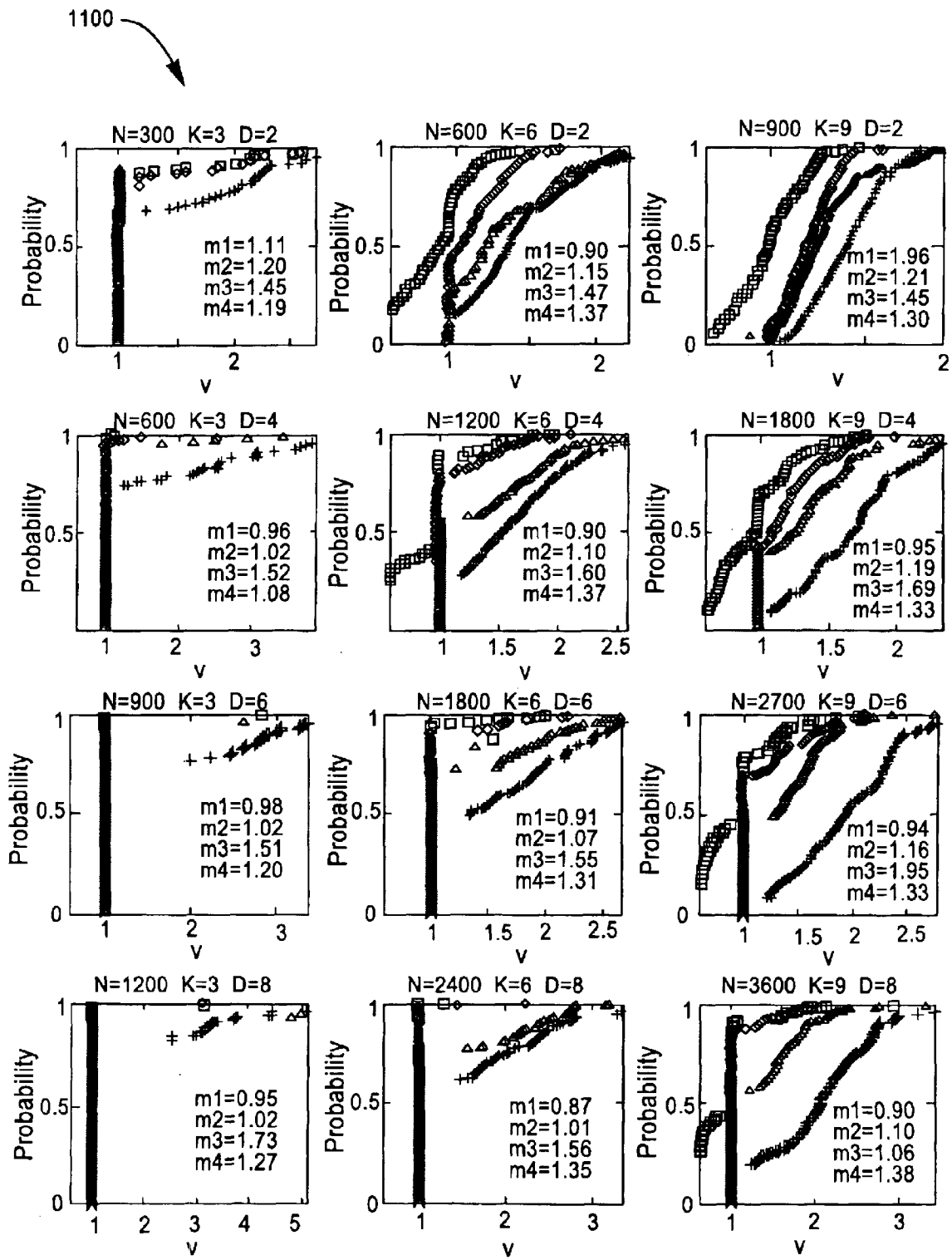
FIG. 11 is a diagram of the accumulative distribution of selected performance ratios.

Referring now to FIG. 11, twelve sets of experiments, with D=2, 4, 6, 8 and K=3, 6, 9, were conducted. In each set, 60 data sets with N=50*D*K were generated by randomly picking N points on K randomly generated hyperplanes and then adding Gaussian noise to the y-components. The regression functions are linear, e.g., hyperplanes. For each dataset, a common initialization of the regression functions was used for all three different processes.

To make direct comparisons of three processes possible, a common performance measure was used, which was chosen to be the LinReg-KM's objective function in equation (2). After LinReg-KHM and LinReg-EM converged, its own performance measure was discarded and the result re-measured by the LinReg-KM's. Doing so is slightly in favor of LinReg-KM. The notations $\text{Perf}_{KHM/KM}$ and $\text{Perf}_{EM/KM}$ were used for these re-measurements.

Taking advantage of the known partitions of the synthetic data sets, $\text{Perf}_{baseline}$, was calculated by running regression on each of the K subsets and adding them up, for comparing against the performance of LinReg-KM and LinReg-KHM. $\text{Perf}_{baseline}$ is close to the global optimum.

FIG. 11 diagrams the accumulative distribution of selected performance ratios;

squares: LinReg-KHM over LinReg-EM;

(*)'s: LinReg-KHM over the baseline;

(+)'s: LinReg-KM over the baseline, triangles: LinReg-EM over the baseline.

m1=mean of the ratios of LinReg-KHM over LinReg-EM, m2=mean of the ratios of LinReg-KHM over the baseline, m3=mean of the ratios of LinReg-KM over the baseline, and m4=mean of the ratios of LinReg-EM over the baseline.

Each curve has sixty points from the sixty runs of RC, without interpolation. Four curves in each plot, are frequency-estimations of the accumulative distributions in equations (22)–(25), with v-axis horizontal and prob-axis vertical, $$Pr(\text{Perf}_{KHM/KM} / \text{Perf}_{EM/KM} < v), \qquad (22\text{-}23)$$
$$Pr(\text{Perf}_{KHM/KM} / \text{Perf}_{baseline} < v)$$

$$Pr(\text{Perf}_{RC-KM} / \text{Perf}_{baseline} < v), \qquad (24\text{-}25)$$
$$Pr(\text{Perf}_{EM/KM} / \text{Perf}_{baseline} < v)$$

The plot of equation (22), in squares, shows how often LinReg-KHM done better then LinReg-EM, with equal performance when the ratio is 1.

The plot of equation (23), in (*)'s, shows how well LinReg-KHM done against the $\text{Perf}_{baseline}$, which should be very close to the true optimum. When the value is close to 1, a very good approximation of the global optimum was found.

The plot of equation (24), in (+)'s and equation (25) in triangles shows how well LinReg-KM and LinReg-EM done against the $\text{Perf}_{baseline}$.

The x-axis was truncated to make the interesting part of the plot (near 1) more readable.

In addition to the plotted distributions in equations (22)–(25), the expectation is also given on each plot, $$m1 \approx E\left(\frac{\text{Perf}_{KHM/KM}}{\text{Perf}_{EM/KM}}\right), \quad m2 \approx E\left(\frac{\text{Perf}_{KHM/KM}}{\text{Perf}_{baseline}}\right), \qquad (26)$$
$$m3 \approx E\left(\frac{\text{Perf}_{EM/KM}}{\text{Perf}_{baseline}}\right).$$

Except for K=3 and D=2, LinReg-KHM done the best among the three. As K and D increase, the performance gaps become larger.

LinReg-EM done better than LinReg-KM on average for all K and D. Such is due to the low dimensionality of the Y-space (dim(Y)=1), where the clustering processes are applied.

In previous comparisons on the performance of center-based clustering processes Zhang, B. (2003), "Comparison of the Performance of Center-based Clustering Processes", the proceedings of PAKDD-03, Seoul, South Korea, April, K-means done better than EM on average on data sets with dimensionality>1. The higher the dimensionality of the data, the more K-Means out-performs EM.

Clustering recovers a discrete estimation of the missing part of the responses and provides each regression function with the right subset of data. A new regression clustering process RC-KHM has been presented herein. It is also observed that LinReg-KHM outperforms both LinReg-EM and LinReg-KM.

In the general form of RC, the regression part of the process is completely general, no requirements are added by the method using the RC process. Such provides an important insight that (a) RC processes work with any type of regression; and (b) RC can be built on top of existing regression libraries and call an existing regression program as a subroutine.

Two other advantages of using RC are provided. Regression helps with understanding of a dataset by replacing the dataset with an analytical function plus a residue noise. When the noise is small, the function describes the data well. The compact representation of a dataset by a regression function can also be regarded as data compression, with significantly smaller mean residue noise.

EM's linear mixing of simple distributions has the most natural probability interpretation. To benefit from both the EM's probability model and the KHM process's robust convergence, it is recommended to run RC-KHM first and use its converged results to initialize RC-EM. RC-KHM does not supply the initial values for $p_k^{(r)}$ and $\Sigma_{r,k}$. To solve this problem, it is recommended to keep the initial function-centers fixed at the RC-KHM's output for a number of iterations to let the probabilities $p_k^{(r)}$ and $\Sigma_{r,k}$, if a non-trivial covariance matrix is used, to converge under RC-EM before setting the function-centers free.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method of determining regression functions from a computer data input, the regression functions for use in data mining, prediction, calibration, segmentation or response analysis, the method using K-Harmonic Means regression clustering and comprising the steps of:

selecting K regression functions $f_1, \ldots, f_K$;

associating an i-th data point from a dataset with a k-th regression function using a soft membership function;

providing a weighting to each data point using a weighting function to determine a particular data point's participation in a calculation of a residue error;

calculating a residue error between a weighted i-th data point and its associated regression function;

iterating to minimize a total residue error; and identifying suitable regression functions for use in the analysis.

2. The method of claim 1, wherein the soft membership function provides a probabilistic association between the i-th data point and the k-th regression function.

3. The method of claim 1, wherein not all data points of the computer data input fully participate in each iteration.

4. The method of claim 1, wherein the total residue error is described by a function in $L^q$-space and the parameter q is greater than 2.

5. A method of determining regression functions from a computer data input $Z=(X,Y)=\{(x_i,y_i)|i=1,\ldots,N\}$, the regression segmentation or response analysis, the method using K-Harmonic Means regression clustering and comprising the steps of:

selecting K regression functions $f_1, \ldots, f_K$, in an r-th iteration;

associating an i-th data point from the dataset Z with a k-th regression function $f_k$ using a soft probability membership function that can be expressed as, $$p(Z_k \mid z_i) = \frac{d_{i,k}^{p+q}}{\sum_{l=1}^{K} d_{i,l}^{p+q}}$$

where $$d_{i,k} = \|f_k^{(r-1)}(x_i) - y_i\|,$$

$p \geq 2$, and where q is a variable parameter;

providing a weighting to each data point $z_i$ using a weighting function that can be expressed as, $$a_p(z_i) = \frac{\sum_{l=1}^{K} d_{i,l}^{p+q}}{\sum_{l=1}^{K} d_{i,l}^{p}}$$

to determine the data point's participation in calculating a residue error;

calculating a residue error between a weighted i-th data point and its associated regression function;

iterating to minimize a total residue error; and identifying suitable regression functions for use in the analysis.

6. The method of claim 5, wherein the residue error is defined by an error function that can be expressed as $e(f_k(x_i),y_i)=\|f_k(x_i)-y_i\|^p$, with $p \geq 2$.

7. The method of claim 5, wherein a regression optimization is used that satisfies, $$f_k^{(r)} = \underset{f \in \Phi}{\operatorname{argmin}} \sum_{i=1}^{N} a_p(z_i) p(Z_k \mid z_i) \|f(x_i) - y_i\|^q, \text{ for } k = 1, \ldots, K.$$

8. The method of claim 5, wherein the K-Harmonic Means objective function is defined by replacing the MIN( ) function of a K Means objective function with a harmonic average, HA( ), function.

9. The method of claim 8, wherein the objective function can be expressed as:

$$Perf_{RC-KHM_p}(Z, M) = \sum_{i=1}^{N} HA_{1 \leq k \leq K} \{\|f_k(x_i) - y_i\|^p\}$$

$$= \sum_{i=1}^{N} \frac{K}{\sum_{k=1}^{K} \|f_k(x_i) - y_i\|^p}.$$

10. The method of claim 5, wherein iterations are done until the change in the objective function between iterations is less than a predetermined threshold.

11. The method of claim 5, wherein the determined regression functions are used to predict outcomes from a new dataset.

12. The method of claim 11, wherein the predictions from the K regression functions on a new data point are provided as K possible values each with an associated probability.

13. The method of claim 5, wherein the determined regression functions are additionally used to initialize an Expectation Maximization regression clustering method.

14. A system for determining regression functions from a computer data input $Z=(X,Y)=\{(x_i,y_i)|i=1,\ldots,N\}$, the system using K-Harmonic Means regression clustering and comprising:

data input and storage means to receive and store the computer data input;

a determined-regression-function display;

a processor providing for:

selecting K regression functions $f_1, \ldots, f_K$, in an r-th iteration;

associating an i-th data point from a dataset Z with a k-th regression function $f_k$ using a soft membership function;

providing a weighting to each data point $z_i$ using a weighting function to determine the data point's participation in calculating a residue error;

calculating a residue error between a weighted i-th data point and its associated regression function;

iterating to minimize a total residue error; and determining suitable regression functions for output.

15. The system of claim 14, wherein the system calls a regression analysis step as a subroutine from an existing program or library.

16. The system of claim 14, wherein the soft membership function provides a probabilistic association between the i-th data point and the k-th regression function.

17. The system of claim 16, wherein the soft membership function can be expressed as, $$p(Z_k \mid z_i) = \frac{d_{i,k}^{p+q}}{\sum_{l=1}^{K} d_{i,l}^{p+q}}$$

where, $$d_{i,k} = \|f_k^{(r-1)}(x_i) - y_i\|,$$

$p \geq 2$, and where q is a variable parameter.

18. The system of claim 14, wherein the weighting function can be expressed mathematically as, $$a_p(z_i) = \frac{\sum_{l=1}^{K} d_{i,l}^{p+q}}{\sum_{l=1}^{K} d_{i,l}^{p}}.$$

19. The system of claim 14, wherein the determined regression functions approximate sales or marketing data, provide economic demand curves, identify segmentation of customer responses, provide calibration parameters, or provide segmentation or interpolation of static or video images.

* * * * *